Patented May 27, 1941

2,243,694

UNITED STATES PATENT OFFICE 2,243,694

HYDROXY BENZOIC ACID ESTERS

Walter G. Christiansen, Glen Ridge, N. J., and Sidney E. Harris, Coral Gables, Fla., assignors to E. R. Squibb & Sons, New York, N. Y., a corporation of New York No Drawing. Application November 18, 1938, Serial No. 241,146

9 Claims. (Cl. 260—473)

This invention relates to, and has for its object the provision of, certain amino-alcohol esters of alkyl-hydroxy-benzoic acids, and methods of preparing them. These esters have the general formula

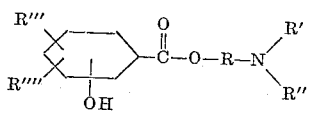

wherein R represents a divalent aliphatic (preferably lower alkylene) radical, R' and R'' represent aliphatic (preferably lower alkyl) radicals, R''' represents an aliphatic (preferably lower alkyl) radical, and R'''' represents hydrogen or an aliphatic (preferably lower alkyl) radical.

The compounds of this invention are valuable therapeutic agents, being particularly effective for inducing local anesthesia. They may be prepared by reacting the appropriate alkyl-hydroxy-benzoyl halide with the appropriate amino-aliphatic alcohol to form the desired ester; or alternatively, by reacting an alkali-metal salt of the appropriate alkyl-hydroxy-benzoic acid with the appropriate amino-aliphatic halide. The resulting amine-esters are generally recovered in the form of their addition-salts with hydrochloric acid. However, other acids forming addition-salts with amines may be used in place of hydrochloric; such acids are boric, nitric, lactic, tartaric, citric, phosphoric, sulfuric, picric and picrolonic. The addition-salts may be converted into the corresponding free bases in the usual manner.

The following examples are illustrative of the invention:

EXAMPLE 1

β-Diethylamino-ethyl ester of 2-hydroxy-3-methyl-benzoic acid 304 grams of 2-hydroxy 3-methyl benzoic acid, commonly known as o-cresotinic acid, melting at 163–4° C., is added to 286 grams of thionyl chloride in a flask equipped with a reflux condenser and protected against moisture with a calcium chloride tube. The reaction mixture is then refluxed for about six hours, after which the excess thionyl chloride is removed in vacuo. The residue is taken up in 685 cc. of dry chloroform, and a solution of 246 grams of β-diethylamino-ethanol in 200 cc. of dry chloroform is gradually added thereto. After refluxing this esterification mixture for about two hours, the chloroform is removed by distillation in vacuum, and the residual solid treated with a 5% sodium carbonate solution. The ester-base thus liberated is dissolved in ether and washed twice with water, then dried over anhydrous sodium sulfate. The ether is removed by distillation, and the residual product fractionated in vacuum. The material boiling between the limits 137–142° C./2 mm. or 150–163° C./4 mm. is considered to be ester-base of sufficient purity for conversion to the hydrochloride. The conversion to the hydrochloride is accomplished by adding an equivalent quantity of an alcoholic solution of hydrogen chloride to a solution of the ester-base in anhydrous chloroform. Upon chilling this solution, β-diethylamino-ethyl ester of 2-hydroxy-3-methyl-benzoic acid (hydrochloride) separates from the solution as a crystalline product. Further quantities of this same product are obtained from the solution by diluting it with anhydrous ether. After recrystallization from alcohol, β-diethylamino-ethyl ester of 2-hydroxy-3-methyl-benzoic acid (hydrochloride) has a melting point of 165° C.

EXAMPLE 2

β-Diethylamino-ethyl ester of 5-hydroxy-3-methyl-benzoic acid

A solution of 13.6 grams β-diethylamino-ethyl chloride in 50 cc. of absolute ethyl alcohol is admixed with 17.4 gram solution of anhydrous sodium 5-hydroxy-3-methyl-benzoate in 50 cc. of absolute ethanol and refluxed for about five hours. At the end of this time the solution is concentrated to small volume, and treated with a sufficient volume of 3% HCl to dissolve the ester-base. This acidulated aqueous solution of the product is extracted with two small volumes of ether to remove any non-nitrogenous impurities, and the free ester-base liberated by means of an excess of sodium hydroxide solution. The thus liberated base is then taken up in ether, and the solution dried over potassium carbonate. When this anhydrous ether solution is treated with a dry ethereal solution of HCl, β-diethylamino-ethyl ester of 5-hydroxy-3-methyl benzoic acid (hydrochloride) separates, whereupon it can be recrystallized from a suitable solvent, such as alcohol or acetone.

EXAMPLE 3

Gamma-dimethylamino-propyl ester of 4-hydroxy-3-methyl-benzoic acid

In the manner described in Example 2, sodium 4-hydroxy-3-methyl benzoate is condensed with gamma-dimethylamino-propyl chloride, and the ester-base produced converted to gamma-dimethylamino-propyl ester of 4-hydroxy-3-methyl benzoic acid (hydrochloride).

EXAMPLE 4

β-Diethylamino-ethyl ester of 6-hydroxy-3-ethyl-benzoic acid

To 18.6 grams of sodium 6-hydroxy-3-ethyl benzoate in 50 cc. of absolute ethanol is added 13.6 grams β-diethylamino-ethyl chloride, and the mixture refluxed for approximately four hours. The solution is then evaporated to dryness, and the residue taken up in anhydrous ether. After filtering this anhydrous ether solution, in order to remove sodium chloride, an equivalent quantity of an anhydrous ethereal solution of HCl is added. The β-diethylamino-ethyl ester of 6-hydroxy-3-ethyl benzoic acid which separates from this solution is recrystallized from alcohol or a mixture of alcohol and anhydrous ether, whereupon it is obtained as a white crystalline solid.

EXAMPLE 5

*β-Diethylamino-ethyl ester of 5-hydroxy-1,3-dimethyl-benzoic acid*

In a manner identical with that described in Example 4, the anhydrous sodium salt of 5-hydroxy-1,3-dimethyl benzoic acid is condensed with β-diethylamino-ethyl chloride, and the resulting ester-base converted to β-diethylamino-ethyl ester of 5-hydroxy-1,3-dimethyl-benzoic acid (hydrochloride).

The following are among the many other compounds embraced by the present invention, and may be prepared according to the directions given above:

6. Gamma - diethylamino-β,β-dimethyl-propyl ester of 2-hydroxy-3-methyl-benzoic acid (hydrochloride); by condensing 2-hydroxy-3-methyl-benzoyl chloride with gamma-diethylamino-β,β-dimethyl-propanol.

7. β-Diethylamino-ethyl ester of 2-hydroxy-4-methyl-benzoic acid (hydrochloride); by condensing β-diethylamino-ethyl chloride with sodium 2-hydroxy-4-methyl-benzoate.

R', R'', R''', and R'''' may, of course, represent aliphatic radicals other than those embodied in the foregoing specific compounds, e. g. propyl, isopropyl, butyl or amyl. The invention may be variously otherwise embodied, within the scope of the appended claims.

We claim:

1. A compound of the group consisting of amino-esters of the general formula

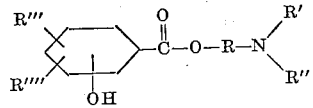

wherein R represents a lower alkylene radical, R', R'' and R''' represent lower alkyl radicals, and R'''' represents a member of the group consisting of hydrogen and lower alkyl radicals; and acid-addition salts thereof.

2. A compound of the general formula

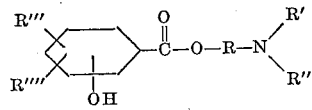

wherein R represents a lower alkylene radical, R', R'' and R''' represent lower alkyl radicals, and R'''' represents a member of the group consisting of hydrogen and lower alkyl radicals.

3. A compound of the general formula

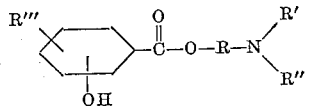

wherein R represents a lower alkylene radical, and R', R'' and R''' represent lower alkyl radicals.

4. The hydrochloride of β-diethylamino-ethyl ester of 2-hydroxy-3-methyl-benzoic acid.

5. β-Diethylamino-ethyl ester of 6-hydroxy-3-ethyl-benzoic acid.

6. Gamma-diethylamino-β,β- dimethyl - propyl ester of 2-hydroxy-3-methyl-benzoic acid.

7. A compound of the general formula

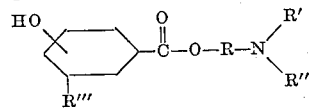

wherein R represents a lower alkylene radical, and R', R'', and R''' represent lower alkyl radicals.

8. A compound of the general formula

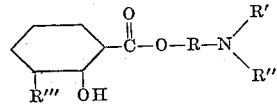

wherein R represents a lower alkylene radical, and R', R'', and R''' represent lower alkyl radicals.

9. An acid-addition salt of β-diethylamino-ethyl ester of 2-hydroxy-3-methyl-benzoic acid.

WALTER G. CHRISTIANSEN.
SIDNEY E. HARRIS.